No. 860,405. PATENTED JULY 16, 1907.
H. McCHESLEY.
HOE.
APPLICATION FILED AUG. 27, 1906.
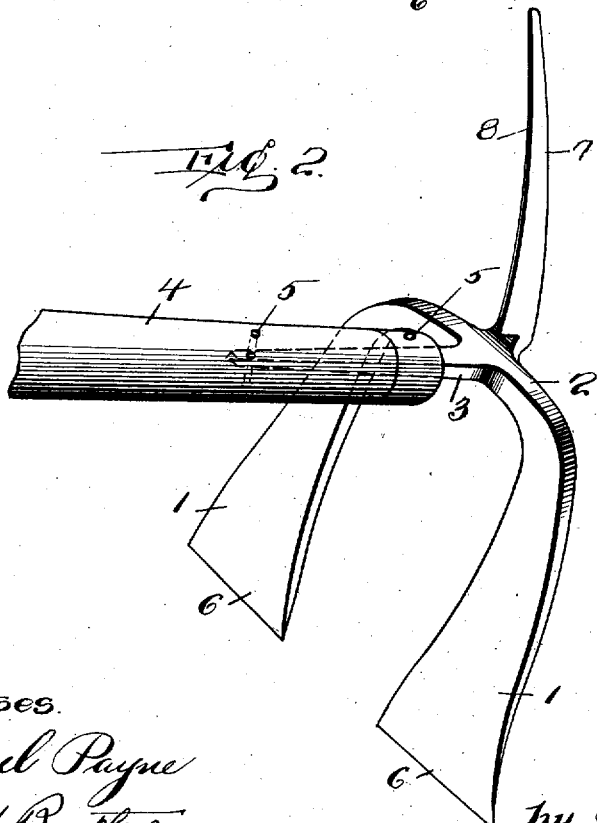
Witnesses.
Samuel Payne
K. H. Butler
Inventor
Hugh McChesley
by H. C. Everett & Co.
Attorneys.
THE NORRIS PETERS CO., WASHINGTON, D. C.

UNITED STATES PATENT OFFICE.

HUGH McCHESLEY, OF SEWARD, PENNSYLVANIA.

HOE.

No. 860,405.  Specification of Letters Patent.  Patented July 16, 1907.

Application filed August 27, 1906. Serial No. 332,143.

*To all whom it may concern:*

Be it known that I, HUGH MCCHESLEY, a citizen of the United States of America, residing at Seward, in the county of Westmoreland and State of Pennsylvania, have invented certain new and useful Improvements in Hoes, of which the following is a specification, reference being had therein to the accompanying drawing.

This invention relates to hoes, and its object is to provide a simple and inexpensive implement adapted for agricultural purposes, and also for use in mixing mortar, and like work.

The improved hoe comprises two separated depending blades, each of wedge-form, connected at their upper ends and provided with a tang for the attachment of the blades to a handle.

The invention also includes an upwardly projecting blade disposed centrally between the depending blades, and adapted for trimming tobacco, tomato, and other plants, and as a weeder.

The construction of the improvement will be fully described hereinafter in connection with the accompanying drawing which forms a part of this specification, and its novel features will be defined in the appended claims.

In the drawing, Figure 1 is a view in perspective illustrating the improvement in use as a garden hoe, and, Fig. 2 is a similar view on an enlarged scale, only a portion of the hoe handle being shown.

The hoe consists of two similar blades 1, integral at their upper ends with the hoe head 2, from which projects centrally an integral tang 3 adapted to be driven into the end of a handle 4, and secured by rivets 5 or like securing means. Each of the blades 1 is gradually-increased in thickness from its lower end to its point of juncture with the head 2, the lower ends 6 being reduced to cutting edges. The blades 1 are also graduated in width from their upper to their lower ends, the latter being of greater width than the upper portions of the blade, so that each blade is of substantially wedge-shape.

As shown, the blades 1, 1 are spaced apart, the space between the blades being gradually increased in width from the plane of the cutting edges, and of a width on the plane of the cutting edges substantially equal to the length of the cutting edge of either of the blades. This construction permits the hoe to be used in a manner to straddle a plant without liability of the projecting portion of the plant being damaged; and when the hoe is used in mixing mortar, the particular shape of the blades causes the mortar material to be thoroughly stirred and admixed, due to the manner in which the material in the path of movement of the blades is caused to move in drawing the hoe through the mass.

Projecting upward centrally from the connecting head 2 is a blade 7 which is preferably curved rearward slightly, and provided with a rear cutting edge 8. The blade 7 is disposed at right angles to the blades 1, that is, the width of the blade 7 is at right angles to the width of the blades 1, so as to bring the cutting edge 8 of said blade 7 in such position that the blade 7 may be used as a scythe blade or sickle blade. This blade is especially well adapted for cutting off the lower leaves of growing plants, and for use as a weeder.

The entire device with the exception of the handle, is made integral, and it affords a serviceable implement for all work for which hoes are required.

Having fully described my invention what I claim as new and desire to secure by Letters Patent is,—

1. A hoe having two depending cutting blades spaced relatively to each other, each having a relatively wide cutting edge, the space between the blades being substantially equal to the width of either of the cutting edges and gradually increasing in width from the plane of the cutting edges upward.

2. A hoe comprising a head having a handle-attaching tang, and two integral depending blades, each of said blades gradually decreasing in thickness from the head of the cutting edge and each tapering in width in the opposite direction to provide an intervening space of gradually-increasing width from the plane of the cutting edges toward the head, said space being substantially equal to the width of either of the cutting edges.

3. A hoe comprising a head having a handle-attaching tang, and two integral depending blades, each of said blades gradually decreasing in thickness from the head to the cutting edge and each tapering in width in the opposite direction to provide an intervening space of gradually-increasing width from the plane of the cutting edges toward the head, said space being substantially equal to the width of either of the cutting edges, and a cutting blade projecting upwardly from a point central of the head and having its width in a plane at right angles to the plane of the cutting edges of the blades, the cutting edge of the upwardly projecting blade being at its rear.

In testimony whereof I affix my signature in the presence of two witnesses.

HUGH McCHESLEY.

Witnesses:
R. C. BRINKER,
J. R. FISHER.